(12) United States Patent
Zielinski et al.

(10) Patent No.: US 12,540,290 B2
(45) Date of Patent: Feb. 3, 2026

(54) MEMBRANE SEPARATION OF USED OIL AND COMPOSITIONS GENERATED

(71) Applicant: EXXONMOBIL TECHNOLOGY AND ENGINEERING COMPANY, Annandale, NJ (US)

(72) Inventors: Christine A. Zielinski, Furlong, PA (US); Paul C. Naegely, Voorhees, NJ (US); Meha H. Shah, Easton, PA (US); Charles L. Baker, Jr., Thornton, PA (US); Chengrong Wang, Easton, PA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 140 days.

(21) Appl. No.: 17/919,195

(22) PCT Filed: Mar. 17, 2021

(86) PCT No.: PCT/US2021/022704
§ 371 (c)(1),
(2) Date: Oct. 14, 2022

(87) PCT Pub. No.: WO2021/216226
PCT Pub. Date: Oct. 28, 2021

(65) Prior Publication Data
US 2023/0159852 A1    May 25, 2023

Related U.S. Application Data

(60) Provisional application No. 63/012,561, filed on Apr. 20, 2020.

(51) Int. Cl.
*C10M 175/00* (2006.01)

(52) U.S. Cl.
CPC .............. *C10M 175/0041* (2013.01); *C10M 175/0033* (2013.01); *C10M 175/005* (2013.01); *B01D 2311/25* (2013.01)

(58) Field of Classification Search
CPC ...... C10M 175/0041; C10M 175/0033; C10M 175/005; C10M 175/00; B01D 2311/2523;
(Continued)

(56) References Cited

U.S. PATENT DOCUMENTS 4,750,990 A      6/1988  Kulkarni et al.
9,394,495 B1 *   7/2016  Murray .................. C10G 67/04

FOREIGN PATENT DOCUMENTS

BE      873451 A    *  7/1979  ........ C10M 175/005
CN   109694724 A    *  4/2019  ........... B01D 61/027
(Continued)

OTHER PUBLICATIONS

International Search Report and Written Opinion for Application No. PCT/US2021/022704, dated Jul. 7, 2021.

*Primary Examiner* — Taiwo Oladapo
(74) *Attorney, Agent, or Firm* — C. Tumey Law Group PLLC

(57) ABSTRACT

In an embodiment is provided a process to re-refine used oil that includes introducing a used oil and a solvent to a separation unit under separation conditions selected to produce a purified oil product, the separation unit comprising a porous membrane, a semiporous membrane, or both; and separating the used oil to obtain an effluent comprising a purified oil product. In another embodiment is provided an apparatus for re-refining used oil that includes a separation unit comprising a porous or semiporous membrane; a used oil feed coupled to an inlet of the separation unit; and an inlet of a diffusate collection unit coupled to an outlet of the separation unit. In another embodiment is provided a com- (Continued)

position generated from a membrane separation process that includes a base oil, the composition having a soot content of about 0.05% or less.

16 Claims, 2 Drawing Sheets

(58) Field of Classification Search
CPC ...... B01D 3/145; B01D 3/40; B01D 11/0415; B01D 11/0492; B01D 61/145; B01D 61/16; B01D 2311/04; B01D 2311/12; B01D 2311/2669; C10G 33/00; C10G 45/00; C10G 47/00; C10G 31/11
See application file for complete search history.

(56) References Cited

FOREIGN PATENT DOCUMENTS

| | | | | |
|---|---|---|---|---|
| EP | 84212 A1 | * | 7/1983 | ............ C10M 11/00 |
| EP | 1712608 A1 | * | 10/2006 | ...... C10M 175/0033 |
| FR | 2920100 A3 | * | 2/2009 | ............ B01D 61/147 |
| GB | 1458314 | | 12/1976 | |
| GB | 1458314 A | * | 12/1976 | .......... C10M 175/06 |
| WO | 9508609 | | 3/1995 | |
| WO | 2011105966 | | 9/2011 | |
| WO | WO-2011105966 A1 | * | 9/2011 | ............ B01D 61/027 |

* cited by examiner

MEMBRANE SEPARATION OF USED OIL AND COMPOSITIONS GENERATED

FIELD

Embodiments of the present disclosure generally relate to processes and apparatus for re-refining used oil, such as used engine oil, and to diffusate compositions generated from the processes and apparatus.

BACKGROUND

The rehabilitation of used oils, e.g., used engine oils, into base oils is made complicated by the large variety and amount of particulates and chemically degraded molecules present in used oils. In addition, when collecting commercially available used oils, the range of chemical components is quite large reflecting the varieties of additives and the different operating history of the used oils. Examples of different operating histories can include the difference between gasoline and diesel engines where operating temperatures and pressures are different, wear metals from the engine and the engine components are different, and the degree of combustion between engines differs dramatically, with diesel engines often producing significant amounts of soot.

Rehabilitating the used oil requires a separation step to remove the degraded products and additives in order to process the base oil fraction. Conventional separation schemes that isolate the nominal base oil fraction rely on combinations of processes that typically involve a distillation step. This distillation step requires relatively high temperatures reflecting the high molecular weight of the base oil, usually carbon number $C_{30}$ and higher, and requiring temperatures well above the temperatures seen while present in engines. As an example, the distillation step of the used oil can require temperatures of greater than about 300° C. under vacuum, while typical operating temperatures of an engine are about 120° C. to about 130° C., or lower. The presence of various additives in the oil that were generally designed to operate at the lower temperature conditions in an engine can further react, even under vacuum, at the temperatures needed to effectively isolate and process the base oil component. This further reaction creates a variety of issues throughout the re-refining process, including the formation of deposits in equipment (e.g., heat exchangers and valves). Such fouling of equipment results in loss of thermal efficiency of the equipment and in frequent maintenance to service the equipment. Alternatively, or additionally, re-refiners traditionally use a caustic treatment operation to remove reactive additives from the used oil, and/or incorporate anti-foulant additives into the used oil to mitigate fouling. Further, caustic treatment can be less favored because the compounds used for caustic treatment are generally detrimental to lubricant formulations and need to be removed after re-refining. The loss of thermal efficiency of the equipment, the costs of anti-foulant additives and caustic treatment, and the loss of production during unscheduled plant shutdowns increase the financial costs of re-refining.

SUMMARY

Embodiments of the present disclosure generally relate to processes and apparatus for processing used oil, such as used engine oil, and to diffusate compositions generated from the processes and apparatus, such as re-refining or processing the used oil into various compositions such as a base stock, base oil, process oil, feedstock or intermediate.

An embodiment of the present invention provides a process to process used oil that includes introducing a used oil and a solvent to a separation unit under separation conditions selected to produce a purified oil product, the separation unit comprising a porous membrane, a semiporous membrane, or both; and separating the used oil to obtain an effluent comprising a purified oil product.

A further embodiment of the present invention provides an apparatus for processing used oil that includes a separation unit comprising a porous or semiporous membrane; a used oil feed coupled to an inlet of the separation unit; and an inlet of a diffusate collection unit coupled to an outlet of the separation unit, the diffusate collection unit being operable to collect a diffusate comprising a base oil.

A still further embodiment of the present invention provides an apparatus for re-refining used oil that includes a separation unit comprising a porous or semiporous membrane; a used oil feed coupled to an inlet of the separation unit; an inlet of a diffusate collection unit coupled to an outlet of the separation unit, the diffusate collection unit being operable to collect a diffusate comprising a base oil; and a retentate feed line coupled to an outlet of the separation unit.

Another embodiment of the present invention provides a composition generated from a membrane separation process that includes a base oil separated from a used oil, the composition having a soot content of about 0.05% or less as determined by ASTM D5967-A4.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
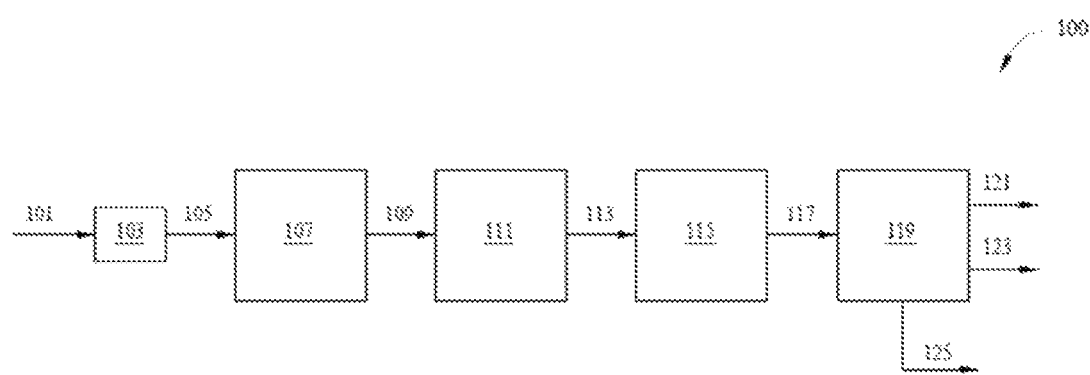
FIG. 1 is a flow diagram of an example distillation and hydrogenation process for re-refining used oils.

For the sake of clarity and simplicity, certain pumps, heaters, piping details, etc. which would be employed in the process and whose location and mode of operation would be within the scope of the ability of those skilled in the art have been omitted, as have the subsequent downstream or upstream processing steps which would be or could be practiced on the various effluent streams.

DETAILED DESCRIPTION

Improved processes and apparatus for re-refining used oil are needed to access purified oil products such as the base oil component of the used oil. Eliminating, or at least reducing, fouling of equipment, deposition of materials, loss of thermal efficiency, maintenance interruptions, and the like from re-refining processes and apparatus is needed.

Embodiments of the present disclosure generally relate to processes and apparatus for re-refining used oil, such as used engine oil, and to diffusate compositions generated from the processes and apparatus. In at least one example, the present disclosure provides a membrane separation process that includes using a separation medium, such as a porous membrane, to separate the various contaminants, such as water, soot, degraded molecules, etc., and additives from the lower molecular weight base oil fractions using, e.g., a low molecular weight, low boiling solvent at temperatures below those found in distillation for the heavier boiling hydrocarbon. The inventors have found that such a membrane separation process avoids or, at least minimizes, equipment fouling typical of conventional re-refining processes. The composition generated from the membrane separation process described herein is unusual because the separation unexpectedly removes several different kinds of molecules, different sizes of molecules, and soot at the same time.

In terms of, at least, the separation of additives and other components of used oil (e.g., metals, soot, and/or polymers) from the base oil component, the methods described herein rival or surpass that of conventional techniques while simultaneously minimizing equipment fouling. The process described herein unexpectedly provides, at least, the advantage of separating both high molecular weight molecules in the used oil such as high molecular weight polymers, but also for small molecular weight molecules such as zinc dithiodiphosphates (ZDDPs) or Mo-containing friction reducing compounds that are typically below the molecular weight of the hydrocarbon fraction (i.e., the base oil fraction). This is unexpected because it is generally believed that most membrane separations are predominantly molecular weight or size separations, rejecting larger molecules but allowing smaller molecules to pass through.

In addition, the inventors have surprisingly found that the processes and apparatus described herein are as effective as, or surpass, conventional distillation for the removal of residual polar additives. This is surprising because with fresh oils (e.g., those oils not previously used in an engine), the polar additives generally pass through this membrane with the base oil fraction. Further, the inventors have found that the processes and apparatus described herein unexpectedly separate the soot fraction from the base oil fraction. Soot is known to be very difficult to separate from used oils due to its small size, uncertain degree of agglomeration, and tendency to plug filtration situations.

For the purposes of this present disclosure, and unless otherwise specified, all numerical values within the detailed description and the claims herein are modified by "about" or "approximately" the indicated value, and consider experimental error and variations that would be expected by a person having ordinary skill in the art.

For the purposes of this disclosure, and unless otherwise indicated, a "composition" includes components of the composition and/or reaction products of two or more components of the composition.

Conventional processes for re-refining used oil include distillation and vacuum distillation to separate the base oil fraction from the used oil. However, during distillation, the used oil is heated at temperatures where components of the used oil react and/or degrade, leading to the accumulation of unwanted materials on the surfaces of re-refining equipment. Frequent maintenance interruptions for cleaning of fouled equipment are required in conventional re-refining processes, thereby severely lessening the commercial efficiency and usefulness of such processes. Alternatively, or additionally, re-refiners traditionally add anti-foulant additives to the used oil, and/or perform a caustic treatment operation to remove reactive additives from the used oil. The loss of production and costs associated with these operations increase the financial costs of re-refining.

In contrast, the methods described herein can provide at least the advantage that the used oil stays below a temperature at which most or all of components of the used oil further react and degrade to deposits. This can, in turn, at least minimize the amount of interruptions needed for cleaning, minimize unscheduled plant shutdowns, eliminate the need for caustic treatment operations, and eliminate the need of using anti-foulant additives in the re-refining process.

Re-refining of used oil typically includes a variety of operations such as mild heating to remove water, a mild distillation to remove lighter fuel fractions that contaminate the used oil, a more severe distillation(s) to separate out the majority of the base oil from the high molecular polymer fractions. The used base oil fraction, typically boiling from about 700° F. to about 1000° F., can then be hydrotreated to reduce the aromatic and polar content of the base oil. The higher molecular weight material can be sold directly into product applications. One very significant debit is that heavy solids fouling occurs essentially throughout the entire train. For example, erosion and/or corrosion can be observed at ejector outlet bends, and various accumulator drum represent one area where rapid deposit formation can be observed when, e.g., the temperature goes outside of the target range for processing. These deposits containing a variety of materials from the used oil, frequently of high molecular weight, oxidized materials including the polymers. Moreover, fouling even occurs at distillation steps towards the end of the process sequence and in product accumulator drums.

Although such fouling occurs at elevated temperatures typical of distillation as one might expect, fouling can also occur at much milder temperatures, such as about 150° C. or more. Given that engine oils are designed to be run at engine temperatures (typically less than about 130° C. or less than about 120° C.), it may not be surprising that these milder temperatures cause deposits especially on used oil where much of the antioxidants have been consumed. Therefore, performing a separation operation at lower temperatures—e.g., where the deposit tendencies are much reduced—would provide an advantage over conventional re-refining. Such temperatures can include those less than about 150° C., or even lower than about 100° C. depending on the choice of solvent used to assist the membrane separation process, or even lower temperatures such as about room temperature. As a non-limiting example, heptane can be used as a solvent useful for the membrane separation process described herein. The boiling point of heptane is about 98° C., which is below or around operating engine temperatures that generated the used oil. Using solvents below or near the operating temperatures at which the used oil is generated can enable the components of the used engine oil, e.g., the base oil, additives, wear metals, etc., to be further processed without the strong likelihood of fouling.

The membrane separation process of the present disclosure can be applicable to any used oil such as petroleum based oils, synthetic oils, and the like, and a combination thereof. In at least one embodiment, any used oil which has been conventionally recovered for reclamation or for burning, or has been discarded after use can be the feedstock used for the present disclosure. Non-limiting examples of used oils can include used lubricating oil, e.g., used crankcase oil, used engine oil, used hydraulic oil, used transformer oil, used refrigerator oil, used white oil, used compressor oil, used gas engine oils, used marine engine oils, or a combination thereof. The used oil can contain synthetic oils and/or mineral oils. The used oil can also contain contaminants such as water, gasoline, gas-oil, solvents, aromatics, cleaning fluids, sediments such as carbonaceous particles and metal particles, as well as polymeric and non-polymeric additives (including by-products of their use) such as dispersants, detergents, corrosion inhibitors, rust inhibitors, metal deactivators, other anti-wear agents and/or extreme pressure additives, anti-seizure agents, wax modifiers, viscosity index improvers, viscosity modifiers, fluid-loss additives, seal compatibility agents, other friction modifiers, lubricity agents, anti-staining agents, chromophoric agents, defoamants, demulsifiers, emulsifiers, densifiers, wetting agents, gelling agents, tackiness agents, colorants, and others, and a combination thereof.

Various waste oil re-refining schemes are commercially known, and one summary may be found in "Waste Engine Oils Rerefining and Energy Recovery" by F. Audibert, Elsevier, 2006 ("Audibert"), which is incorporated herein by reference in its entirety. Typical examples are illustrated in FIGS. 7.7 and 7.8 of Audibert.

In at least one embodiment, the inclusion of a membrane separation process of the present disclosure can be performed at any stage in a re-refining process where there are contaminants in the used oil. As non-limiting examples, the membrane separation process can be performed before or after dewatering, before or after initial distillation, before or after hydrotreatment, or even prior to catalytic treatment in place of a guard bed. Such examples are not intended to limit the placement of the membrane separation process in a refinery.

FIG. 1 is a flow diagram of an example distillation and hydrogenation process 100 for re-refining used oils. The used oil can be fed via line 101 to a pretreatment unit 103 where chemical additives can be added and/or a de-fouling reaction can occur. The used oil is fed through line 105 to a unit 107 where the used oil can be heated to remove water and can be subjected to a mild distillation to remove lighter fuel fractions that contaminate the used oil. The used oil can then be transferred to a more severe distillation, such as a vacuum distillation and/or a high-temperature distillation, at distillation unit 111. The distilled effluent can then be fed via line 113 to a hydroteating unit 115. After hydrotreating, the hydrotreated effluent can be fed to a fractionating unit 119 to separate light base oil fractions 121, medium base oil fractions 123, and heavy base oil fractions 125, among other components.

Figure 2:
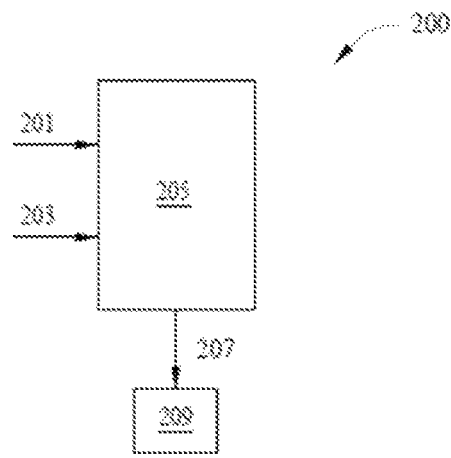
FIG. 2 is a flow diagram of an example apparatus for carrying out certain aspects of the present disclosure.

FIG. 2 is a flow diagram of an example apparatus 200 for carrying out certain aspects of the present disclosure according to at least one embodiment. More generally, a configuration shown in FIG. 2 or similar to FIG. 2 can be used to separate a used oil (for example, separating the base oil fraction from additives, water, metals, contaminants, etc.) and obtain a diffusate comprising a purified product, for example a base oil fraction. Used oil can enter the separation unit 205 via a used oil feed line 201. Solvent, if any, can be fed to the separation unit 205 via solvent feed line 203. In the separation unit 205, the used oil can be separated into a diffusate and a retentate, and the diffusate can include the desired hydrocarbon fraction (e.g., the base oil). The diffusate can be fed to a diffusate storage tank 209 via diffusate line 207. Of note, the diffusate storage tank 209 can be, e.g., a pipeline, a tank truck, a rail car, or another suitable means to transport or hold the diffusate. In some embodiments, the diffusate can be fed to one or more processes of a re-refining process, such as hydrotreating, distillation, decanting, fractionation, extraction, water removal, and the like.

In some embodiments, the retentate in the separation unit 205 can be fed to the used oil feed line 201, and re-enter the separation unit 205.

Figure 3:
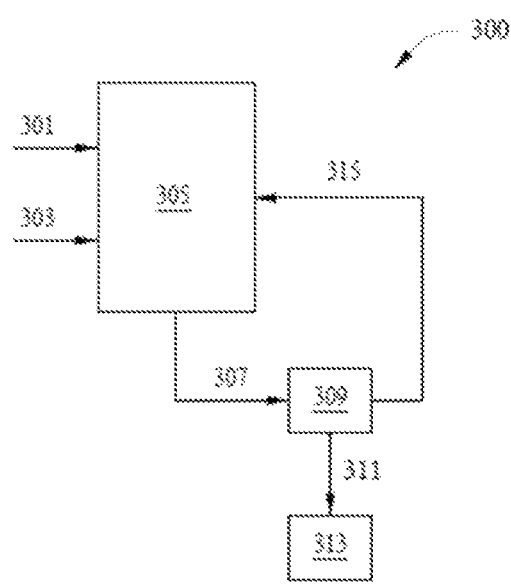
FIG. 3 is a flow diagram of an example apparatus for carrying out certain aspects of the present disclosure.

FIG. 3 is a flow diagram of an example apparatus 300 for carrying out certain aspects of the present disclosure according to at least one embodiment. More generally, a configuration shown in FIG. 3 or similar to FIG. 3 can be used to separate a used oil and obtain a diffusate comprising a base oil fraction. Used oil can enter a used oil solution unit 305 via used oil line 301. Solvent, if any, can be fed to the used oil solution unit 305 via solvent feed line 303. In the used oil solution unit 305, the used oil can be mixed with the solvent (if any) and/or may be pre-treated (e.g., to remove water). Alternatively, or additionally, and in some embodiments, the used oil and the solvent (if any) can be directly fed to the separation unit 309, bypassing the used oil solution unit 305.

The used oil solution can be fed to separation unit 309 from the used oil solution unit 305 via used oil solution line 309. In the separation unit 309, the used oil can be separated into a diffusate, which can include the desired the base oil, and a retentate. The diffusate can be fed to a diffusate storage tank 313 via diffusate line 311. The diffusate storage tank 313 can be, e.g., a pipeline, a tank truck, a rail car, or another suitable means to transport or hold the diffusate. In some embodiments, the diffusate can be fed to one or more processes of a re-refining process, such as hydrotreating, distillation, decanting, fractionation, extraction, water removal, and the like.

Depending on the operating parameters and/or the objective of the separation, the retentate can contain a portion of the desired hydrocarbon fraction (e.g., the base oil) that is not filtered. This may be due to, e.g., residence time of the used oil in the separation unit and/or a molecular weight cut off of the membrane. The retentate can be fed to the used oil solution unit 305 via line 315. The retentate comprising a portion of the base oil can then undergo separation to recover the base oil, separation to recover the solvent, or a combination thereof. Alternatively, or additionally, and in some embodiments, the retentate can be fed to the used oil feed line 301 and re-enter the separation unit 305.

Embodiments of the present disclosure also generally relate to processes to re-refine or process used oil. In at least one embodiment, a process to re-refine or process used oil can include a membrane separation process. The membrane separation process, in some embodiments, can include introducing a used oil and, optionally a solvent, to a separation unit under separation conditions selected to produce a purified oil product (e.g., a base oil), and separating the used oil to obtain the purified oil product.

The membrane separation process can separate the used oil into a diffusate fraction that includes the oil-rich components (e.g., base oil(s)) and a retentate fraction, the fraction retained by the membrane. The retentate fraction can include solids, particulates, additives (which may be degraded), other contaminants, or a combination thereof. In some embodiments, the retentate fraction can be treated to recover any solvent retained in the retentate fraction. In some embodiments, the retentate fraction can be discarded. In at least one embodiment, the retentate fraction can contain unresolved base oil depending on the objective of the membrane separation process, and so the retentate can be further separated to remove the base oil fraction.

In the separation unit of the present disclosure, and in some embodiments, the used oil can be mixed with a solvent at a temperature below or about the boiling point of the solvent. Although solvent is not needed for the membrane separation process, solvent can aid in, e.g., the speed of the membrane separation process. Other forces could enhance the speed of the membrane separation process in the absence of solvent (or in addition to using a solvent), such as a vacuum. The amount of heat supplied to the separation unit can be sufficient to boil the solvent added to the used oil in the separation unit according to some embodiments. In at least one embodiment, operating temperatures during separation can be much lower than the boiling point of the solvent.

Selection of the solvent can be based on, at least, the temperature at which the solvent boils, the type of membrane used for the separation, or a combination thereof. In some embodiments, the solvent used for the separation can have a boiling point of about 300° C. or less, such as about 275° C. or less, such as about 250° C. or less, such as about 225° C. or less, such as from about 0° C. to about 200° C., such as from about 10° C. to about 190° C., such as from about 15° C. to about 180° C., such as from about 20° C. to about 170° C., such as from about 25° C. to about 165° C., such as from about 30° C. to about 160° C., such as from about 45° C. to about 155° C., such as from about 50° C. to about 150° C. such as from about 55° C. to about 145° C., such as from about 60° C. to about 140° C. such as from about 65° C. to about 135° C., such as from about 70° C. to about 130° C. such as from about 75° C. to about 125° C., such as from about 80° C. to about 120° C., such as from about 85° C. to about 115° C., such as from about 90° C. to about 110° C. such as from about 95° C. to about 105° C. In some embodiments, the solvent used for the separation can have a boiling point of about 300° C. or more. In at least one embodiment, the boiling point of the solvent can be from about 15° C. to about 90° C., such as from about 20° C. to about 75° C., such as from about 25° C. to about 60° C. In some embodiments, the boiling point of the solvent can be from about 15° C. to about 45° C., such as from about 20° C. to about 40° C., such as from about 25° C. to about 35° C., or from about 15° C. to about 30° C., such as from about 15° C. to about 25° C.

In some embodiments, the boiling point of the solvent can be selected to mitigate degradation of the materials in the used oil. Lower boiling solvents can be beneficial as such solvents require less heat to be removed from the used oil after the membrane separation process.

Non-limiting examples of solvents can include hydrocarbons such as n-pentane, n-hexane, n-heptane, cyclopentane, and cyclohexane; aromatic hydrocarbons such as benzene, toluene, and xylene; alcohols such as methanol, ethanol, 1-propanol, isopropanol, 1-butanol, isobutanol, n-butanol, t-butanol, 1-pentanol, and ethylene glycol; ketones such as acetone, methyl ethyl ketone, and methyl isobutyl ketone; ethers such as diethyl ether, methyl tert-butyl ether (MTBE), petroleum ether, and tetrahydrofuran; chlorinated solvents such as dichloromethane, chloroform, carbon tetrachloride, ethylene dichloride, and chlorobenzene; esters such as ethyl acetate, mixed heptyl acetate esters, mixed hexyl acetate esters, and mixed octyl acetate esters. Other non-limiting examples of solvents can include acetonitrile, dimethyl formamide, dimethyl acetamide, and dimethyl sulfoxide, among others. A single solvent or a mixture of two or more solvents can be used for the membrane separation process.

Other parameters for selecting a solvent can include solvent polarity, its ability to solvate additives and/or contaminants in the used oil, or a combination thereof. In at least one embodiment, a non-polar solvent, a polar solvent, or a combination thereof can be used. Non-polar solvents can aid in separating the polar fractions of the used oil.

In at least one embodiment, and when the solvent is a mixture of solvents, the solvent composition used can depend on the type of used oil and/or the additives and contaminants present therein. In some embodiments, the solvent composition (v/v) can be from about 1:1 to about 10:1, such as from about 1:1 to about 9:1, such as from about 2:1 to about 8:1, such as from about 3:1 to about 6:1, such as from about 4:1 to about 5:1. In at least one embodiment, the majority of the solvent volume can be one or more non-polar solvents.

The separation unit can include one or more separation mediums such as a membrane, such as a porous membrane and/or a semiporous membrane. Selection of the membrane can be based on, at least, the porosity of the membrane, the membrane's compatibility with the operating parameters of the separation (e.g., temperature, pressure), the membrane's compatibility with the oil and/or the solvent, the molecular size of the additives and/or contaminants present in the used oil, or a combination thereof.

In at least one embodiment, the membrane can be selected to separate components having a molecular weight cut-off of about 100,000 Daltons or less, such as about 50,000 Daltons or less, such as about 40,000 Daltons or less, such as about 30,000 Daltons or less, such as about 25,000 Daltons or less, such as about 20,000 Daltons or less, such as about 15,000 Daltons or less, such as about 10,000 Daltons or less, such as about 9,000 Daltons or less, such as about 8,000 Daltons or less, such as about 7,000 Daltons or less, such as about 6,000 Daltons or less, such as about 5,000 Daltons or less, such as about 4,000 Daltons or less, such as about 3,000 Daltons or less, such as about 2,000 Daltons or less, such as about 1,000 Daltons or less.

In at least one embodiment, the membrane can have symmetric pores where the pores are more uniform or asymmetric pores where the pores have variable pore diameters. In some embodiments, the pores can have a diameter of less than about 10 µm, such as from about 0.1 µm to about 10 µm or from about 0.001 µm to about 0.1 µm. In at least one embodiment, the diameter of the pores can be from about 0.1 µm to about 10 µm, such as from about 1 µm to about 9 µm, such as from about 2 µm to about 8 µm, such as from about 3 µm to about 7 µm, such as from about 4 µm to about 6 µm. In some embodiments, the diameter of the pores can be from about 0.001 µm to about 0.1 µm, such as from about 0.005 µm to about 0.095 µm, such as from about 0.01 µm to about 0.09 µm, such as from about 0.02 µm to about 0.08 µm, such as from about 0.03 µm to about 0.07 µm, such as from about 0.04 µm to about 0.006 µm. In at least one embodiment, the membrane can be charged to aid in separating components of the used oil.

Non-limiting examples of materials that can be included in the membrane, or make up the membrane, can include latex, polytetrafluoroethylene, polyvinylidene difluoride, polypropylene, polysulfones such as polyethersulfone, nylon and other polyamides, cellulose, cellulose acetate, cellulose nitrate, regenerated cellulose, alumina-based material (such as Anopore), polycarbonates, graphenes, and glass microfiber/glass fiber. Among the parameters useful to select a membrane is the hydrophibicity/hydrophilicity of the membrane. For example, polytetrafluoroethylene is a hydrophobic membrane, polypropylene is a slightly hydrophobic membrane. Nylon and cellulose acetate are hydrophilic membranes. In some embodiments, the membrane can be porous, semiporous, or a combination thereof.

In at least one embodiment, the used oil can be separated under separation conditions. Separation conditions can include a residence time of the used oil in the separation unit, a temperature, a solvent to used oil ratio, or a combination thereof.

Residence time can depend on, at least, the objective of the separation. For example, if the objective is moderate separation, the separation can be performed on the order of minutes. If the objective is separation >95%, then the separation can be performed on the order of hours. Residence time of the used oil can also depend on the material to be retained by the membrane. For example, higher molecular weight components of the used can be separated in less time. Shorter residence times can sometimes lead to the base oil being retained by the membrane. In some embodiments, the residence time of the used oil in the separation unit can be about 1 minute (min) or more, such as about 30 min or more, such as from about 1 hour (h) to about 72 h, such as from about 10 h to about 60 h, such as from about 16 h to about 48 h, such as from about 20 h to about 44 h, such as from about 24 h to about 40 h, such as from about 28 h to about 36 h, such as from about 30 h to about 32 h. In at least one embodiment, the residence time of the used oil can be about 72 h or more. In some embodiments, a residence time of about 16 h to 48 h can accomplish the separation to collect about 98% or more of the base oil, or even about 99% or more of the base oil, or even all the base oil.

The operating temperature of the separation can be a function of the solvent used for the separation. In some embodiments, the operating temperature can be about 300° C. or less, such as about 275° C. or less, such as about 250° C. or less, such as about 225° C. or less, such as from about 0° C. to about 200° C., such as from about 10° C. to about 190° C., such as from about 15° C. to about 180° C., such as from about 20° C. to about 170° C., such as from about 25° C. to about 165° C., such as from about 30° C. to about 160° C., such as from about 45° C. to about 155° C., such as from about 50° C. to about 150° C. such as from about 55° C. to about 145° C., such as from about 60° C. to about 140° C. such as from about 65° C. to about 135° C., such as from about 70° C. to about 130° C. such as from about 75° C. to about 125° C., such as from about 80° C. to about 120° C., such as from about 85° C. to about 115° C., such as from about 90° C. to about 110° C. such as from about 95° C. to about 105° C. In some embodiments, the operating temperature can be about 300° C. or more. In at least one embodiment, the operating temperature can be from about 15° C. to about 90° C., such as from about 20° C. to about 75° C., such as from about 25° C. to about 60° C. In some embodiments, the operating temperature can be from about 15° C. to about 45° C., such as from about 20° C. to about 40° C., such as from about 25° C. to about 35° C., or from about 15° C. to about 30° C., such as from about 15° C. to about 25° C.

In at least one embodiment, the amount of solvent added to the used oil can be based on a solvent to used oil ratio (v/v). The solvent to used oil ratio useful in at least some embodiments can be about 1:400 or less, such as 1:200 or less. In some embodiments, the solvent to used oil ratio (v/v) can be from about 1:4 to about 1:7, such as from about 1:5 to about 1:6. In some embodiments, the solvent to used oil ratio can be from about 2:1 to about 10:1, such as from about 3:1 to about 9:1, such as from about 4:1 to about 8:1, such as from about 5:1 to about 7:1. In some embodiments, no solvent may be used for the separation.

Any reasonable pressure can be used to keep the solvent liquid. For example, pentane or butane can be used under different pressures.

In some embodiments, the used oil can be stirred, mixed, or agitated to ensure homogeneity of the solvent and used oil mixture. Any reasonable pressure can be used to keep the solvent liquid. For example, pentane or butane can be used under different pressures.

Typically, one separation (i.e., a first separation) can be sufficient to separate the components of the used oil. However, and in some embodiments, more than one separation can be performed. The one or more separations can utilize the same or different separation conditions as the first separation, the same or different separation medium, e.g., the membrane, as the first separation, the same or different solvent(s) as the first separation, etc. In some embodiments, the retentate from the one or more separations can be discarded. Alternatively, and in some embodiments, the retentate from the one or more separations can be treated to recover any solvent retained in the retentate fraction. In at least one embodiment, the retentate can be separated to remove base oil, if any, that was retained in the retentate fraction.

Other membrane separation techniques such as diafiltration and ultrafiltration can be used. Diafiltration typically involves removal or separation of components based on their molecular size by using micro-molecule permeable filters. Ultrafiltration is a membrane filtration technique, in which hydrostatic pressure forces a liquid against a semi permeable membrane to separate the component of interest by size.

In some embodiments, the separation can be a continuous process. For example, a separation unit can be continuously fed, e.g., by injection, with a used oil, and optionally a solvent. The separation can occur and the diffusate can be continuously removed from the separation unit. The membrane can be replaced as necessary. The retentate can be continuously removed and can be treated to remove solvent retained, if any, base oil retained, if any, or a combination thereof.

In some embodiments, and after the membrane separation process, the process can include an optional operation of removing the solvent from the diffusate by distillation, extraction, fractionation, or a combination thereof.

In at least one embodiment, and prior to the membrane separation process, the process can include an optional operation of heating the used oil to a temperature of about 130° C. or less, such as about 120° C. or less, such as about 110° C. or less for the purposes of removing lower boiling contaminants such as water from the used oil.

An optional centrifugation operation to help isolate the base oil product can be performed before or after the membrane separation process.

In an optional operation, and after the membrane separation process, a highly polar solvent such as methanol, water, ethylene glycol, or a combination thereof, can be added to the diffusate. Such an operation can aid in removing polar additives and/or small molecular weight molecules that may be present, if any, in the diffusate. In some embodiments, the amount of highly polar solvent added to the used oil, provided as a volume ratio of highly polar solvent to diffusate (v/v), can be less than about 1:1, such as about 10% v/v or less, such as about 5% v/v or less, such as about 4% v/v or less, such as about 3% v/v or less, such as about 2% v/v or less, such as about 1% v/v less, such as about 0.5% v/v or less.

As a non-limiting example, and in at least one embodiment, the used oil can be separated into a diffusate, the fraction containing the base oil fraction, and a retentate, the fraction retained by the membrane. The diffusate and retentate can include different materials. For example, the diffusate can contain antioxidants, extreme pressure additives, anti-wear agents, rust inhibitors, and friction modifiers, polar additives, and the retentate can contain dispersants, pour point depressants, and viscosity modifiers. In at least one embodiment, the polar additives can be separated from the diffusate by adding a polar solvent, e.g., methanol. In at least one embodiment, the diffusate includes the non-polar solvent, e.g., heptane, and the non-polar solvent can be removed by any suitable means such as distillation. The polar solvent, such as methanol, can be removed from the diffusate by decanting techniques known in the art.

In at least one embodiment, the used oil feed for the membrane separation process can include a soot content of about 5% or less, such as about 4% or less, such as about 3% or less, such as about 2% or less, such as about 1.9% or less, such as about 1.8% or less, such as about 1.7% or less, such as about 1.6% or less, such as about 1.5% or less, such as about 1.4% or less, such as about 1.3% or less, such as about 1.2% or less, such as about 1.1% or less, such as about 1.0% or less, such as about 0.9% or less, such as about 0.8% or less, such as about 0.7% or less, such as about 0.6% or less, such as about 0.5% or less, as determined by ASTM D5967-A4.

In at least one embodiment, the used oil feed for the membrane separation process can include a metals content (e.g., Zn, Mg, Ca, Mo, Fe or a combination thereof) of about 10,000 ppm or less, such as about 9,000 ppm or less, such as about 8,000 ppm or less, such as about 7,000 ppm or less, such as about 6,000 ppm or less, such as about 5,000 ppm or less, such as about 4,500 ppm or less, such as about 4,000 ppm or less, such as about 3,500 ppm or less, such as about 3,000 ppm or less, such as about 2,500 ppm or less, such as about 2,000 ppm or less, such as about 1,500 ppm or less, such as about 1,000 ppm or less, as determined by ASTM D5185.

In at least one embodiment, the used oil feed for the membrane separation process can include a base oil. Base oils that can be included in the feed for the membrane separation process of the present disclosure may be selected from natural oils, synthetic oils, and unconventional oils, and/or mixtures thereof, and can be used unrefined, refined, or re-refined (the latter is also known as reclaimed or reprocessed oil). Unrefined oils can include those obtained directly from a natural or synthetic source and used without added purification. These can include shale oil obtained directly from retorting operations, petroleum oil obtained directly from primary distillation, and ester oil obtained directly from an esterification process.

Natural oils can include animal oils and vegetable oils (e.g., castor oil, lard oil); liquid petroleum oils and hydro-refined, solvent-treated or acid-treated mineral oils of the paraffinic, naphthenic and mixed paraffinic-naphthenic types. Oils of lubricating viscosity derived from coal or shale can also be in the feed. Synthetic lubricating oils can include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); polyphenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., can constitute another class of base oils in the feed. These are exemplified by polyoxyalkylene polymers prepared by polymerization of ethylene oxide or propylene oxide, and the alkyl and aryl ethers of polyoxyalkylene polymers (e.g., methyl-polyisopropylene glycol ether having a molecular weight of 1000 or diphenyl ether of poly-ethylene glycol having a molecular weight of 1000 to 1500); and mono- and polycarboxylic esters thereof, for example, the acetic acid esters, mixed $C_3$-$C_8$ fatty acid esters and $C_{13}$ Oxo acid diester of tetraethylene glycol.

Another class of synthetic lubricating oils in the feed can include the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Non-limiting examples of such esters can include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters in the feed can also include those made from $C_5$ to $C_{12}$ monocarboxylic acids and polyols and polyol esters such as neopentyl glycol, trimethylolpropane, pentaerythritol, dipentaerythritol and tripentaerythritol.

Silicon-based oils such as the polyalkyl-, polyaryl-, polyalkoxy- or polyaryloxysilicone oils and silicate oils can also be in the feed. Such oils include tetraethyl silicate, tetraisopropyl silicate, tetra-(2-ethylhexyl)silicate, tetra-(4-methyl-2-ethylhexyl)silicate, tetra-(p-tert-butyl-phenyl) silicate, hexa-(4-methyl-2-ethylhexyl)disiloxane, poly(methyl)siloxanes and poly(methylphenyl)siloxanes. Other synthetic lubricating oils in the feed can include liquid esters of phosphorous-containing acids (e.g., tricresyl phosphate, trioctyl phosphate, diethyl ester of decylphosphonic acid) and polymeric tetrahydrofurans.

The base stock or base oil of the feed can include a Group I, Group II, Group III, Group IV, or Group V oil or blends of the aforementioned oils. Definitions for the oils as used herein are the same as those found in the American Petroleum Institute (API) publication "Engine Oil Licensing and Certification System", Industry Services Department, Fourteenth Edition, December 1996, Addendum 1, December 1998. Group I base stocks have a viscosity index of between 80 to 120 and contain greater than 0.03% sulfur and/or less than 90% saturates. Group II base stocks have a viscosity index of between 80 to 120, and contain less than or equal to 0.03% sulfur and greater than or equal to 90% saturates. Group III stocks have a viscosity index greater than 120 and contain less than or equal to 0.03% sulfur and greater than 90% saturates. Group IV includes polyalphaolefins (PAO). Group V base stock includes base stocks not included in Groups I-IV. The table below summarizes properties of each of these five groups. The table below summarizes properties of each of these five groups.

| Base Oil Properties | | | |
| --- | --- | --- | --- |
| Group | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | polyalphaolefins (PAO) | | |
| Group V | All other base oil stocks not included in Groups I, II, III or IV | | |

The processes described herein can be scaled up to meet commercial needs.

Also disclosed herein are compositions generated from a membrane separation process. According to various embodiments of the invention, the compositions produced by the methods, processes and apparatus include base stocks, base oils, process oils, feedstocks and intermediates, including feedstocks and intermediate for refinery and other processes. These compositions generated have unique and unexpected properties, e.g., soot content and metals content.

In at least one embodiment, the composition generated from the membrane separation process can include a soot content of about 2% or less, such as about 1% or less, such as about 0.5% or less, such as about 0.4% or less, such as about 0.3% or less, such as about 0.2% or less, such as about 0.1% or less, such as about 0.09% or less, such as about 0.08% or less, such as about 0.07% or less, such as about 0.06% or less, such as about 0.05% or less, such as about 0.04% or less, such as about 0.03% or less, such as about 0.02% or less, such as about 0.01% or less, as determined by ASTM D5967-A4.

In some embodiments, composition generated from the membrane separation process can include a metals content (e.g., Zn, Mg, Ca, Mo, Fe or a combination thereof) of about 200 ppm or less, such as about 150 ppm or less, such as about 100 ppm or less, such as about 90 ppm or less, such as about 80 ppm or less, such as about 70 ppm or less, such as about 60 ppm or less, such as about 50 ppm or less, such as about 50 ppm or less, such as about 40 ppm or less, such as about 30 ppm or less, such as about 20 ppm or less, such as about 10 ppm or less, such as about 5 ppm or less, as determined by ASTM D5185.

EXAMPLES

Example 1

Re-refining used oil was conducted using a small scale Soxhlet extractor. The used oil (50-60 g) was placed in a membrane, and the membrane was placed in the extraction chamber of the Soxhlet extractor. Heptane (300 ml), as the solvent, was added to a boiling flask attached to the Soxhlet extractor and was heated to reflux for about 48 hours. The membrane used in this example is a latex probe cover. Heptane was removed from the phase containing the base oil fraction (the diffusate).

The retentate, the fraction retained by the membrane, and the diffusate were submitted to elemental analyses using standard methods. Table 1A illustrates that the sample was resolved into a low contaminant diffusate and a high contaminant retentate. Nitrogen content was determined according to ASTM D7562. Determination of other elements were performed according to standard test methods ASTM D5185 and ASTM D6443. The retentate was analyzed to confirm that most of the material that was originally in the feed and not in the diffusate did, in fact, appear in the retentate. Prior to analyzing the retentate, the retentate was dissolved in xylene.

TABLE 1A

| Description | Feed | Diffusate | Retentate |
| --- | --- | --- | --- |
| Yield (wt %) | | 90 | 10 |
| Total Nitrogen, ppm (ASTM D7562) | 1313 | 330 | 4554 |
| ASTM D5185, ppm | | | |
| Boron | 21 | 6 | 187 |
| Calcium | 1350 | 32 | 13054.8 |
| Iron | 74 | 2 | 759 |
| Magnesium | 938 | 26.6 | 9159 |
| Phosphorus | 778 | 67.5 | 7312 |
| Zinc | 961 | 36.6 | 9412 |
| ASTM D6443, mass % | | | |
| Chlorine | 0.01 | 0.006 | 0.1518 |
| Sulfur | 0.188 | 0.038 | 1.5686 |

Numerical values in the table are modified by "about" or "approximately" the indicated value.

The soot content of the diffusate and the feed was measured according to ASTM D5967-A4, and the results are shown in Table 1B.

TABLE 1B

| Description | Feed | Diffusate |
| --- | --- | --- |
| Sample 1 | 0.82% | 0.05% |
| Sample 2 | 1.75% | 0.05% |

Certain results and beneficial effects of the separation are summarized in Table 1A and Table 1B. The membrane separation process removes both wear metals, such as Fe, Ni, Cu, and/or Pb, and metals that are used in engine oil additives, such as Ca, Na, Mg, and/or Mo. Here, the metallic elements were all reduced by a very large amount, as high as about 90% or more. This is unexpected since the metal-containing molecules in the used oil are often degraded and would be expected to be in the diffusate fraction. Further, the effectiveness of the method described herein is demonstrated by the fact that the soot in the oils, while not nearly as large as the polymeric molecules, also concentrates in the retentate. Soot is a loose aggregate of small carbonaceous particles that should, in theory, be able to pass through the membrane. While not wishing to be bound by any theory, it is believed that the additive-rich retentate can aid in isolating the soot away from the diffusate. This same surprise is evident in the high % removal of metallic components. Such components, as part of anti-wear agents, friction reduction agents, and antioxidants normally come through a membrane in fresh, unused oils.

Example 2

Re-refining used oil was conducted in a similar manner as in Example 1. Table 2 shows the diffusate fraction of an example versus a comparative. The Comparative represents a conventional distillation. The distillation was run on the same used oil feed as that used for Example 2. The distillation was run under vacuum (about 20 mm Hg absolute) and the actual maximum pot temperature was around 620° F. The distillation separated the lower boiling fraction material from the high molecular weight additives and polymers, under vacuum. The distillation overheads, which is a 1050°

F.-fraction from the distillation (shown in Table 2 as the Comparative), were analyzed for trace metals according to ASTM D5185 to determine the quality of the separation. The Comparative illustrated the tendency of the used oil to form deposits at typical processing conditions necessary to recover the valuable, heavier fractions. For example, about 88% of the materials were recovered as lower boiling fractions and the remaining 12% was a soft, rubbery coke in the distillation apparatus.

TABLE 2

| Description | Feed | Example 2, Diffusate | Comparative, 1050° F.-fraction |
| --- | --- | --- | --- |
| Yield (wt %) | | 90% | 88% |
| ASTM D5185, ppm | | | |
| Boron | 21 | 6 | 1 |
| Calcium | 1350 | 32 | 0 |
| Iron | 74 | 2 | <0.06585 |
| Magnesium | 938 | 27 | <0.039303 |
| Molybdenum | <1 | <0.07 | <0.069987 |
| Phosphorus | 778 | 68 | 8 |
| Zinc | 961 | 37 | <2.712 |

Numerical values in the table are modified by "about" or "approximately" the indicated value.

Ca is a signature for detergent, while Zn and P are signatures for low molecular weight additives such as zinc dithiodiphosphates (ZDDPs). For most of the metals present in the used oil, e.g., Ca, Mg, and Zn, the separation described herein removes about 95% or more, and for Si, the separation is close to about 90% and similar to that of conventional distillation. However, as opposed to typical re-refining processes, the method described herein avoids, or at least minimizes, fouling of equipment and degradation of used oil components caused by caustic reagents and high temperatures.

The inventors have found that the separation described herein can have excellent separation of very high molecular weight molecules such as polymers that are in engine oil, but also surprisingly for much small molecular weight molecules such as ZDDP that are typically below the molecular weight of the base oil fraction. This is surprising because the smaller molecular weight molecules would be expected to pass through the membrane. In addition, the methods described herein are as effective as distillation for the removal of residual polar additives. This is surprising because with fresh oils (e.g., those oils not previously used in an engine), the polar additives generally pass through this membrane with the base oil fraction.

The composition generated from the membrane separation process described herein is unusual because the separation unexpectedly removes several different kinds of molecules, different sizes of molecules, and soot at the same time. For example, zinc is typically in fuels as a low molecular weight additives (e.g., ZDDPs) designed to be in the hydrocarbon phase. However, the membrane separation process enables removal zinc-based additives. As another example, soot is generally difficult to separate from used oils owing to at least its small size, tendency to clog membranes, and uncertain degree of agglomeration. However, the membrane separation process enables removal of the soot. Large polymeric additives, and polar additives are also removed.

In terms of, at least, the separation of additives and other components of used oil (e.g., metals, soot, and/or polymers) from the base oil component, the methods described herein rival or surpass that of conventional techniques while simultaneously minimizing equipment fouling. Overall, the membrane separation process can, at least, improve or substantially replace the conventional multi-step re-refining process. For example, since the membrane separation process described herein removes contaminants in the used oil, higher boiling separations can be performed, and thereby enabling more base oil recovery than exists currently. Moreover, the membrane separation process minimizes the incidence and frequency of plant shutdowns for coke and deposit removal, enabling lower production costs. As described herein, the low temperature separation of used oil components assists in reducing, e.g., coking, fouling, corrosion, and scale formation in the equipment used for re-refining used oil. In addition, using a low temperature during the separation, as opposed to higher temperatures observed with distillation further results in energy savings. Moreover, high yields of the lubricating oil stock component of the used oil can be realized because the low temperature separation minimizes breakdown of the lubricating oil stock component into lighter fractions.

EMBODIMENTS LISTING

The present disclosure provides, among others, the following embodiments, each of which may be considered as optionally including any alternate embodiments.

Clause 1. A process to re-refine used oil, comprising:
introducing a used oil and a solvent to a separation unit under separation conditions selected to produce a purified oil product, the separation unit comprising a porous membrane, a semiporous membrane, or both; and
separating the used oil to obtain an effluent comprising a purified oil product.

Clause 2. The process of Clause 1, further comprising removing the solvent by distillation, extraction, fractionation, decanting, or a combination thereof.

Clause 3. The process of Clause 1 or 2, wherein the solvent comprises a non-polar solvent, or wherein the solvent has a boiling point of 200° C. or less, or a combination thereof.

Clause 4. The process of any one of Clauses 1-3, wherein the solvent is selected from the group consisting of pentane, hexane, heptane, benzene, toluene, xylene, methanol, ethanol, 1-propanol, methyl ethyl ketone, methyl isobutyl ketone, and a combination thereof.

Clause 5. The process of any one of Clauses 1-4, wherein the separation conditions comprise a residence time of the used oil in the separation unit, wherein the residence time is 72 hours or less, or wherein the residence time is from about 16 hours to about 48 hours.

Clause 6. The process of any one of Clauses 1-5, wherein the separation conditions comprise an operating temperature of from about 15° C. to about 150° C., or from about 15° C. to about 90° C., or from about 15° C. to about 60° C., or from about 15° C. to about 30° C.

Clause 7. The process of any one of Clauses 1-6, wherein the used oil is a used crankcase oil, used engine oil, used hydraulic oil, used transformer oil, used refrigerator oil, used white oil, used compressor oil, used gas engine oils, used marine engine oils, or a combination thereof.

Clause 8. The process of any one of Clauses 1-7, wherein the porous membrane or semiporous membrane has a molecular weight cut-off of about 2,000 Daltons or less.

Clause 9. The process of any one of Clauses 1-8, wherein the porous membrane or semiporous membrane is a latex containing material, a polyamide containing material, a cellulose containing material, a polycarbonate containing material, a polysulfone containing material, or a combination thereof.

Clause 10. The process of any one of Clauses 1-9, wherein the purified oil product has a soot content of about 0.05% or less as determined by ASTM D5967-A4.

Clause 11. The process of any one of Clauses 1-10, the purified oil product has an amount of Zn, Mg, Ca, Mo, Fe, or a combination thereof of 100 ppm or less as determined by ASTM 5185.

Clause 12. The process of any one of Clauses 1-11 further comprising removing water from the used oil prior to introducing the used oil to the separation unit.

Clause 13. The process of any one of Clauses 1-12 further comprising removing the solvent from the effluent.

Clause 14. The process of any one of Clauses 1-13 further comprising:
hydrotreating the effluent comprising the purified oil product;
separating the effluent comprising the purified oil product into one or more base oil fractions; or
a combination thereof.

Clause 15. An apparatus for re-refining used oil, comprising:
a separation unit comprising a porous or semiporous membrane;
a used oil feed coupled to an inlet of the separation unit; and
an inlet of a diffusate collection unit coupled to an outlet of the separation unit, the diffusate collection unit being operable to collect a diffusate comprising a base oil.

Clause 16. The apparatus of Clause 15 further comprising a distillation unit or an extraction unit, wherein an inlet of the distillation unit or the extraction unit is coupled to an outlet of the diffusate collection unit.

Clause 17. The apparatus of Clause 15 or 16 further comprising a hydrotreating unit, wherein an inlet of the hydrotreating unit is coupled to an outlet of the diffusate collection unit.

Clause 18. An apparatus for re-refining used oil, comprising:
a separation unit comprising a porous or semiporous membrane;
a used oil feed coupled to an inlet of the separation unit;
an inlet of a diffusate collection unit coupled to an outlet of the separation unit, the diffusate collection unit being operable to collect a diffusate comprising a base oil; and
a retentate feed line coupled to an outlet of the separation unit.

Clause 19. The apparatus of Clause 18, wherein the retentate feed line is coupled to the used oil feed.

Clause 20. The apparatus of Clause 18 or 19 further comprising a distillation unit or an extraction unit, wherein an inlet of the distillation unit or the extraction unit is coupled to an outlet of the diffusate collection unit.

Clause 21. The apparatus of any one of Clauses 18-20 further comprising a hydrotreating unit, wherein an inlet of the hydrotreating unit is coupled to an outlet of the diffusate collection unit.

Clause 22. A composition generated from a membrane separation process, comprising:
a base oil having a soot content of about 0.05% or less as determined by ASTM D5967-A4 or an amount of Zn, Mg, Ca, Mo, Fe, or a combination thereof of 100 ppm or less as determined by ASTM 5185.

Clause 23. The composition of Clause 22, wherein the composition has an amount of Zn, Mg, Ca, Mo, Fe, or a combination thereof of 100 ppm or less as determined by ASTM 5185.

Clause 24. The composition of Clauses 23 and 24, wherein the composition has a trace amount of Zn, Mg, Ca, Mo, or Fe as determined by ASTM 5185.

Clause 25. The composition of Clause 22, wherein the composition has a soot content of about 0.05% or less as determined by ASTM D5967-A4.

Clause 26. The composition of Clauses 25, wherein the composition has a trace amount of soot as determined by ASTM D5967-A4.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

What is claimed is:

1. A process to re-refine used oil, comprising:
introducing a used oil comprising soot content and metal content, and a solvent to a separation unit under separation conditions selected to produce a purified oil product, wherein the separation unit comprises a porous membrane, a semiporous membrane, or both; and
separating, via the separation unit, the used oil to obtain a diffusate and a retentate, the diffusate comprising the purified oil product and a portion of the soot content making up 0.09% or less of the diffusate, and the retentate comprising a remaining portion of the soot content not in the diffusate and at least 90% of the metal content, wherein the metal content of the retentate isolates the remaining portion of the soot content not in the diffusate away from the diffusate,
wherein the porous membrane or semiporous membrane has a molecular weight cut-off of 2,000 Daltons or less, and
wherein the solvent is selected from the group consisting of pentane, hexane, heptane, benzene, toluene, xylene, methanol, ethanol, 1-propanol, methyl ethyl ketone, methyl isobutyl ketone, and combinations thereof.

2. The process of claim 1, further comprising removing the solvent by distillation, extraction, fractionation, decanting, or a combination thereof.

3. The process of claim 1, wherein the separation conditions comprise a residence time of the used oil in the separation unit, wherein the residence time is 72 hours or less.

4. The process of claim 1, wherein the separation conditions comprise an operating temperature of from about 15° C. to about 150° C.

5. The process of claim 1, wherein the used oil is a used crankcase oil, used engine oil, used hydraulic oil, used transformer oil, used refrigerator oil, used white oil, used compressor oil, used gas engine oils, used marine engine oils, or a combination thereof.

6. The process of claim 1, wherein the porous membrane or semiporous membrane is a latex containing material, a polyamide containing material, a cellulose containing material, a polycarbonate containing material, a polysulfone containing material, or a combination thereof.

7. The process of claim 1, wherein the portion of the soot content makes up 0.05% or less of the diffusate as determined by ASTM D5967-A4.

8. The process of claim 1, wherein the diffusate comprises a portion of the metal content comprising an amount of Zn, Mg, Ca, Mo, Fe, or a combination thereof of 100 ppm or less as determined by ASTM 5185.

9. The process of claim 1 further comprising removing water from the used oil prior to introducing the used oil to the separation unit.

10. The process of claim 1 further comprising removing the solvent from the diffusate, the retentate, or both.

11. The process of claim 1 further comprising:
hydrotreating the diffusate comprising the purified oil product;
separating the purified oil product into one or more base oil fractions; or
a combination thereof.

12. The process of claim 1, wherein the separation conditions comprise a residence time of the used oil in the separation unit, wherein the residence time is from about 16 hours to about 48 hours.

13. The process of claim 1, wherein the separation conditions comprise an operating temperature of from about 15° C. to about 60° C.

14. The process of claim 1, wherein the separation conditions comprise an operating temperature of from about 15° C. to about 30° C.

15. The method of claim 1 wherein the purified oil product comprises the portion of the soot content, the portion of the soot content making up 0.01% to about 2% as determined by ASTM D5967-A4.

16. The method of claim 1 wherein at least a portion of the metal content is from an oil additive comprising at least one additive selected from the group consisting of a dispersant, a detergent, a corrosion inhibitor, a rust inhibitor, a metal deactivator, an anti-wear agent, an extreme pressure additives, an anti-seizure agent, a wax modifier, a viscosity index improver, a viscosity modifier, a fluid-loss additive, a seal compatibility agent, a friction modifier, a lubricity agent, an anti-staining agent, a chromophoric agent, a defoamant, a demulsifier, an emulsifier, a densifier, a wetting agent, a gelling agent, a tackiness agent, a colorant, and a combinations thereof.

* * * * *